Nov. 16, 1943.    F. LEISTER ET AL    2,334,338
SEXTANT
Filed July 9, 1941
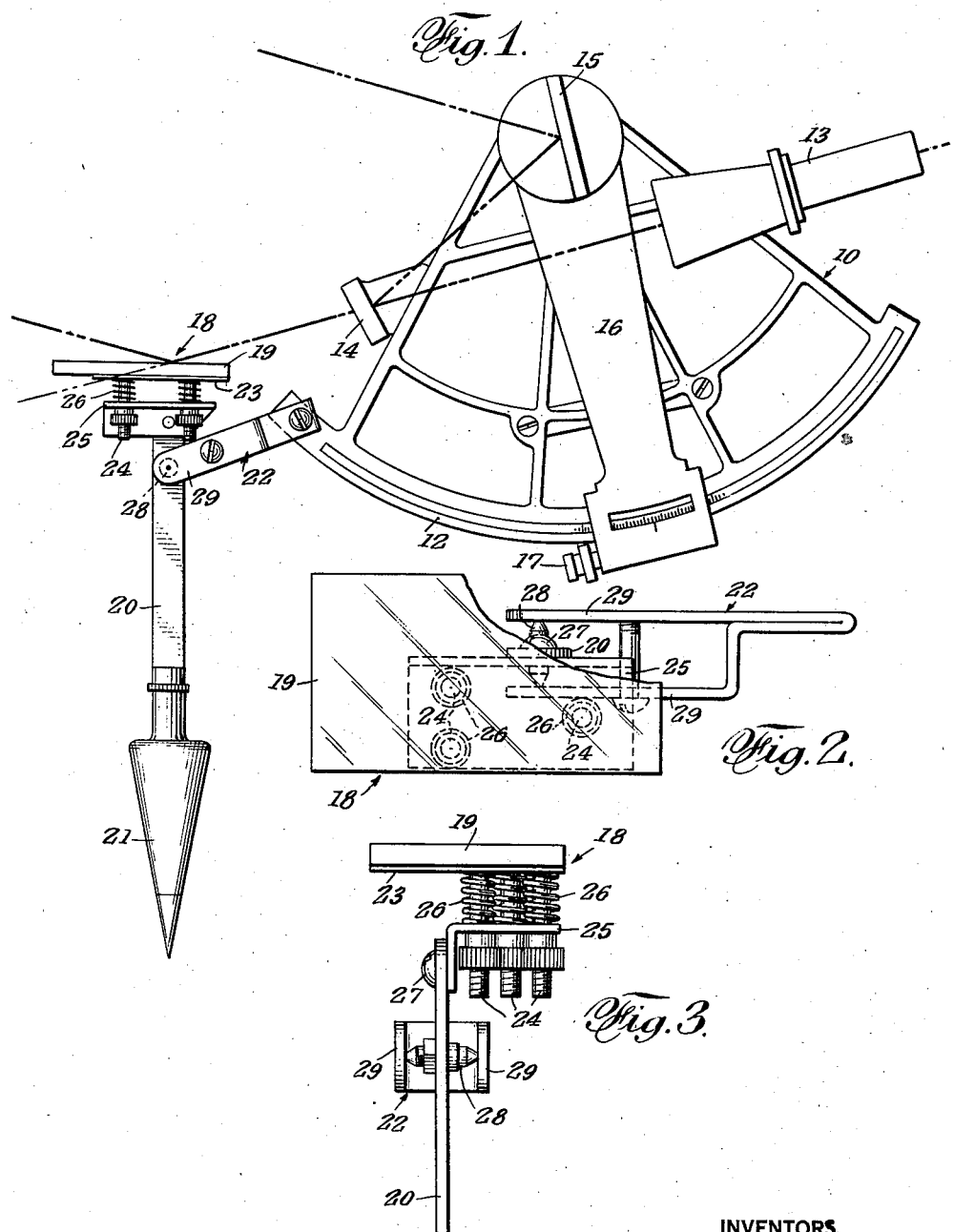
INVENTORS
Fayette Leister
BY Herbert A. Leister
Mitchell Bechert
ATTORNEYS.

Patented Nov. 16, 1943

2,334,338

UNITED STATES PATENT OFFICE 2,334,338

SEXTANT

Fayette Leister, Detroit, Mich., and Herbert A. Leister, Philadelphia, Pa.

Application July 9, 1941, Serial No. 401,619

1 Claim. (Cl. 88—2.7)

This invention relates to improvements in observation instruments such as sextants and the like and more particularly to instruments of this general character provided with artificial-horizon reflectors.

At sea the location of the observer may be obtained by measuring the angles between the horizon and the sun or certain stellar bodies. When, however, the horizon cannot be observed because the observer is so located on land that he cannot see the horizon or because he is compelled to take observations at night or when the horizon is otherwise obscured, use has been made of an artificial horizon consisting of a covered basin of mercury or a carefully leveled reflector, in each case mounted on a stationary support. Such artificial horizons cannot be used satisfactorily on flying aircraft or ships at sea. It has been proposed to use bubble sextants and like instruments to take altitude measurements of stars under such difficult conditions. However, experience has shown that the precision of a measurement of altitude of a star by use of its own reflected image is greatly superior to measurement by means of a bubble or light which has no necessary relation to the body being observed.

The main object of the present invention is to provide a novel and advantageous instrument whereby the altitudes of stars and the like may be measured with considerable accuracy under adverse conditions such as hereinbefore described.

Another object is to provide a novel and advantageous sextant including an artificial horizon device comprising a mirror arranged to reflect the image of the observed object along the line of sight of the sextant to the eye of the observer and means for automatically adjusting or leveling the mirror along the line of sight.

Another object is to provide an improved sextant having an artificial horizon mirror and means acting to adjust or level the mirror along the line of sight and to tend to place the sextant in a vertical plane.

A further object is to provide an artificial horizon device adapted for attachment to a sextant or the like and comprising an artificial horizon mirror and means for automatically adjusting or leveling the same along the line of sight of a sextant to which it may be attached.

According to one embodiment of the invention, the artificial horizon mirror or reflector may be mounted on a suitable support or frame by means of leveling means and the frame may be attached to the upper end of a link or arm fixed at its lower end to a plumb. The upper part of the link may be pivoted on a bracket adjustably supported on the limb or other part of the frame of the sextant. The pivoting of the arm on the bracket may be about an axis perpendicular to the plane through the index glass, the horizon glass, and the eye piece, so that the artificial horizon reflector will be leveled along the line of sight by means of the plumb. The bracket may be adjustable on the sextant frame to place the artificial horizon reflector in proper position with reference to the line of sight. Such adjustability may be necessary, especially if the pivotal axis about which the reflector swings is not at the reflecting surface. It has been found by actual experiments that very accurate readings may be obtained by a sextant thus modified.

By use of the instrument of the present invention, a navigator may use any star within the range of the instrument regardless of the visibility of the horizon. This is very advantageous for the observations of stars and planets in that it is not limited to a relatively short interval, as that of twilight, during which the stars and planets have begun to show while the horizon is still clearly visible. If depending upon sighting the horizon, the navigator cannot wait until a star reaches a desired bearing but must use the short period which is available for such observations. With the present device the observer can use a stellar body regardless of the horizon. Few devices for the general purpose of this invention exist, and such devices are in general very complicated and not too accurate. When one realizes that the best navies in the world, the air corps, and others, have struggled with the problem and now use only various bubble developments, it is evident that the present invention provides a solution of a difficult and highly important problem.

Other objects, features and advantages will appear upon consideration of the following description and of the illustrative drawing, in which:

Fig. 1 is a side elevation illustrating one embodiment of the invention;

Fig. 2 is a top plan view of the artificial horizon device separate from the instrument; and Fig. 3 is an elevation of the artificial horizon device of Fig. 2 as viewed from the left.

Referring to the drawing, there is shown for the purpose of illustration a sextant having a main frame 10 including a handle and a graduated measuring arc or limb 12, an eye-piece 13, a vertically divided horizon glass 14 of which the left half is clear and the right half is silvered, and an index glass or mirror 15 mounted upon an index arm 16 pivoted to swing about an axis at the reflecting surface of the index glass 15. The other end of the index arm 16 is movable along the arc 12, and its angular position therealong may be determined by means of an adjusting and measuring device 17, illustrated as including a micrometer but which might be any other suitable device such as a vernier. The horizon glass 14 is so inclined to the line of sight of the eyepiece and horizon glass that light reflected from said index glass 15 to the lower part of the horizon glass 14, will be reflected to the eye-piece. For simplicity the usual light screens of different degrees of opacity have been omitted from the drawing.

Thus far, the description applies generally to usual types of sextants which may be used to determine the altitude of objects above the horizon by looking through the eye-piece 13 and the upper clear portion of the horizon glass, at the horizon when that is visible, and then, while the sextant is substantially vertical, shifting the index arm 16 to position the index glass to reflect light from the observed object to the lower half of the horizon glass 14 from which the light will again be reflected through eye-piece 13 to the eye of the observer.

To obtain a reasonably accurate measurement between the line of sight determined by the eye-piece 13 and horizon glass 14, and the line of sight from the eye-piece to the object being observed, the index arm is shifted to bring the image on the lower half of the horizon glass 14 to the line of division between the mirror section and the clear section of such horizon glass. The angle between the mirrors is only one-half the angle between the line of sight through the eye-piece and the line of sight from the eye-piece to the object being observed and the ordinary sextant has its limb 12 graduated to show twice the actual angle between the index arm 16 and its zero position.

In the event that the horizon be obscured, it has been customary in the past to use with the sextant an artificial horizon consisting of a pool of mercury with glass thereover to prevent disturbance by wind or like, or consisting of any suitably leveled mirror. These forms of artificial horizons cannot, however, be used on vessels at sea where their surfaces would constantly be changed in accordance with the movement of the vessels, or on moving aircraft.

According to the present invention the sextant has been provided with an artificial horizon device 18 such as illustrated in the drawing. This artificial horizon device may include a plane mirror 19 corresponding to the reflecting surface of the mercury, means for pivotally supporting the artificial horizon glass 19 on the frame of the sextant, and also means for automatically leveling said artificial horizon glass. The artificial horizon glass 19 may be supported and held substantially horizontal by means including a link or lever 20 connected at its upper end to the mirror 19 to swing therewith and at its lower end to a rigidly attached plumb-bob 21. Pivotal support for the mirror 19 may be provided by means of a bracket 22 adjustably clamped to the frame 10 of the sextant. At its other end the bracket 22 is pivotally connected to the upper end of the link 20.

When the sextant is held in a substantially vertical position the plumb 21 acts to level the artificial horizon reflector 19 and to assure leveling of the mirror 19 when the plumb 21 is at rest.

It is desirable to provide separate leveling or adjusting means for said artificial horizon reflector 19 on its support. To this end the mirror or reflector 19 is secured to a base or plate 23 from which depend three screws 24 projecting downwardly from the base 23 through openings in a plate 25. These screws 24 are surrounded between the members 23 and 25 by springs 26 which serve to yieldably support the member 23. Beneath the plate or member 25, the screws are provided with nuts which may be used to adjust the mirror. As clearly shown, the link 20 is secured at its upper end to the member or plate 25 by means of a clamping screw 27. The pivotal support of the link or arm 20 may be effected by providing link 20 with oppositely projecting pivots or gudgeons 28 which enter suitable openings in the side members 29 of bracket 22. Obviously, the manner of connecting and supporting the various parts may be varied without departing from the spirit of the invention.

In using the combined instrument for determining the elevation of a star, the sextant may be held in the usual manner. The plumb not only tends to keep the mirror 19 level along the line of sight from the eye-piece, but also tends to assist in positioning the sextant vertically as far as turning about the line of sight through the eye-piece.

In using the instrument with the attached artificial horizon device, the sextant is held in a substantially vertical plane and the parts are shifted by the observer until he sees reflected from the artificial horizon mirror 19 the image of the object to be observed. Then the index arm 16 is shifted until the light from the observed object is reflected from the index mirror 15 to the fixed horizon glass and reflected to the eye-piece, the two reflected images being brought substantially to coincidence along the line of division between the lower mirror of horizon glass 14. The angle between the line of sight through the eye-piece and the horizon glass 14 and the line of light from the observed object to the mirror 19 is twice the altitude of the object observed. The altitude of the star can be obtained by reading the instrument if due consideration be given to the spacing of the graduations on the arc or limb 12. Obviously, if the limb or arc were graduated in actual degrees of arc, the altitude could be read directly from the arc. As soon as the reflected images are brought into substantial coincidence, the arm may be clamped to the limb. If desired, further adjustment may be by means of the adjusting device 17 after or before shifting the sextant from observing position to a position for observing the reading on the limb 12.

It would appear that sidewise tilting of the reflector 19 will tend to shift the apparent position of the reflected image with reference to the image resulting from the reflection from the horizon glass. This condition may be of assistance in leveling the instrument transversely by bringing the two images into coincidence.

It will be evident that difficulty may be encountered in observing stars of high altitude, that is near the zenith. For example, it would be necessary in order to observe stars near the zenith to have the artificial horizon mirror 19 so supported on the frame of the sextant as to be capable of movement through about 90° about an axis transverse with respect to the sextant frame, and to have the index arm of the sextant so arranged that it could be moved to read approximately 90 full degrees along the arc. It will also be evident that the greater the altitude of the star or observed object, the further down the line of sight through the eye-piece must be turned and as the altitude approaches 90° the sextant or the head of the observer might get in the line between the star and the artificial horizon mirror, thus interfering with suitable observation of the star.

One way in which the difficulty of observing high altitude stars might be avoided would be to tilt the artificial horizon mirror toward the sextant a definite number of degrees. Then the observer could read the angle of elevation of the star above the inclined mirror and then obtain the total altitude measurement by adding to the observed angle, the angle of the mirror above the horizontal.

It should be understood that the action of the artificial horizon mirror might be made almost identical with that of the usual artificial horizon by supporting the artificial horizon mirror 19 by means of gimbals.

It should be understood that various changes may be made and that various features may be used without others, without departing from the true spirit and scope of the invention.

What we claim is:

A sextant or like instrument comprising the combination with a frame, an eye-piece and a horizon glass mounted on said frame and providing a line of sight, and a pivotally mounted index-glass, of an artificial horizon device including a support, a link means adjustably carried by said frame and pivotally connected to said support for connecting said support to said frame for swinging adjustment on the latter, said support including a weight below the pivotal connection for plumbing the support, a reflector carried by said support, and means for adjusting the reflector on said support for leveling the reflector.

FAYETTE LEISTER.
HERBERT A. LEISTER.